United States Patent [19]

Pernicano et al.

[11] 4,392,901
[45] Jul. 12, 1983

[54] REFLECTIVE GARMENT AND METHOD OF MANUFACTURING SAME

[76] Inventors: Vincent S. Pernicano, 2833 Railroad St., Boyne Falls, Mich. 49713; Michael R. Wright, 24297 Ridgeview Dr., Farmington Hills, Mich. 48018

[21] Appl. No.: 350,333

[22] Filed: Feb. 19, 1982

Related U.S. Application Data

[62] Division of Ser. No. 198,926, Oct. 20, 1980, abandoned, which is a division of Ser. No. 60,466, Jul. 25, 1979, Pat. No. 4,248,500.

[51] Int. Cl.³ .................... B32B 31/00; C09J 7/00
[52] U.S. Cl. ............................ 156/155; 156/231; 156/239; 156/249; 156/309.6; 427/148
[58] Field of Search ............... 156/298, 300, 247, 283, 156/284, 234, 231, 239, 155, 238, 246, 249, 289, 309.6, 344, 242; 427/152, 148, 257, 199, 204, 278; 350/97, 98; 404/17

[56] References Cited

U.S. PATENT DOCUMENTS

| | | | |
|---|---|---|---|
| 3,172,942 | 3/1965 | Berg | 156/247 |
| 3,956,552 | 5/1976 | Geary | 427/148 |
| 3,970,494 | 7/1976 | Pritchard | 156/155 |
| 4,023,889 | 5/1977 | Eagon et al. | 350/105 |
| 4,075,049 | 2/1978 | Wood | 350/105 |
| 4,102,562 | 7/1978 | Harper | 350/97 |
| 4,103,060 | 7/1978 | Bingham et al. | 427/199 |
| 4,104,102 | 8/1978 | Eagon et al. | 156/298 |
| 4,140,563 | 2/1979 | Sernaker | 428/914 |

Primary Examiner—Edward C. Kimlin
Assistant Examiner—Louis Falasco
Attorney, Agent, or Firm—Harold W. Milton, Jr.

[57] ABSTRACT

A reflective heat transfer combination and the method of making same whereby a tacky mixture of tack wax and mineral spirits defines a carrier layer applied over a paper substrate capable of absorbing the carrier layer when melted in response to heat and disposing a layer of glass beads over the carrier layer and forcing the glass beads into the carrier layer and against the paper substrate while allowing portions of the beads to be exposed above the carrier layer. A liquid binder layer of acrylic plastic is disposed around the beads and over the carrier layer while leaving portions of the beads exposed and is dried to retain the beads in position. Thereafter a liquid reflective coat of acrylic plastic is applied over the binder layer and covering the beads to provide a reflective background for reflecting light back through the beads. While the reflective coat is liquid and before being dried, a powdered adhesive is disposed over the reflective coat and thereafter the reflective coat is dried. The transfer is applied to an article, such as an article of clothing, by placing the reflective coat with the powdered adhesive therein against the article and applying heat and pressure to the paper substrate whereby the tacky carrier layer melts and is absorbed into the paper substrate while at the same time the powdered adhesive melts and bonds to the article whereby the beads are exposed upon removal of the paper substrate with the carrier layer absorbed thereinto.

1 Claim, 8 Drawing Figures

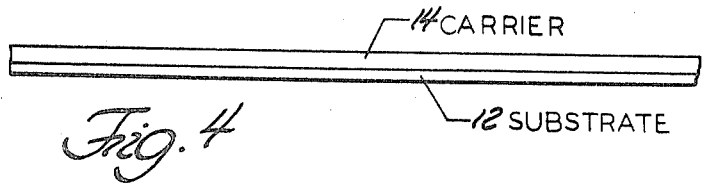
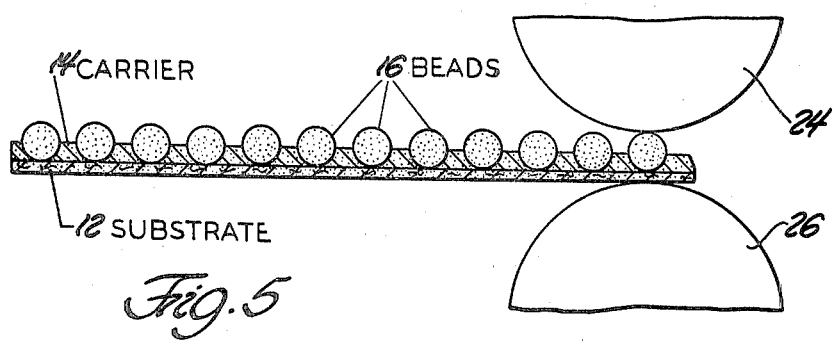
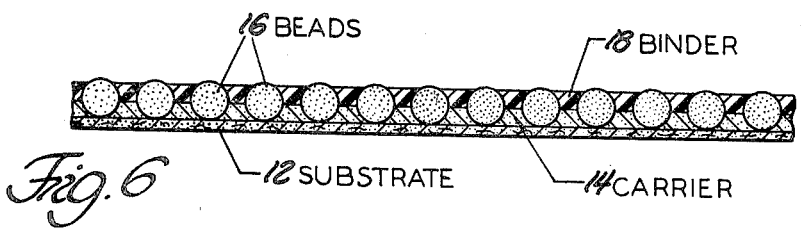
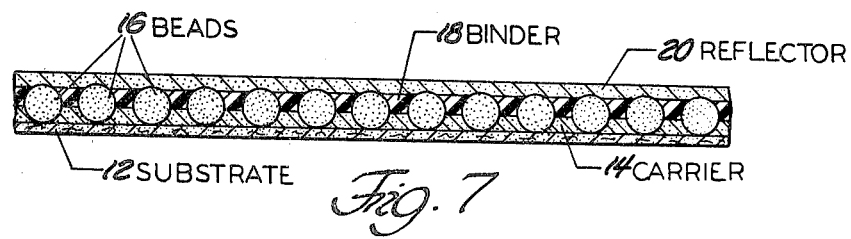
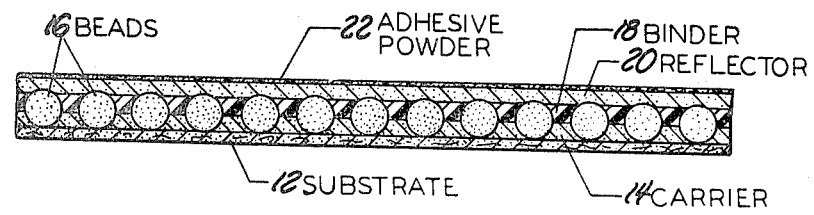

REFLECTIVE GARMENT AND METHOD OF MANUFACTURING SAME

This application is a divisional of application Ser. No. 198,926, filed Oct. 20, 1980 now abandoned, which in turn is a divisional of U.S. Ser. No. 60,466, filed July 25, 1979, now U.S. Pat. No. 4,248,500.

BACKGROUND OF THE INVENTION (1) Field of the Invention

The subject invention relates to reflective sheeting of the type including a light-returning layer of small reflective particles and, specifically, small glass beads or spheres partially embedded in a bonding or binder layer with light-reflecting means located behind the beads. Such sheets have the property of reflecting back a brilliant cone of light toward the source of an angularly incident ray and have been called reflex reflectors. Such reflectors are to be distinguished from specular reflectors such as mirrors which do not reflect or return light in the direction of incidence when light is striking the mirror surface at an angle other than 90°.

(2) Description of the Prior Art

There are numerous reflective heat transfer combinations known in the prior art. Nearly all include reflective particles such as glass beads embedded within a binder layer with a reflecting means disposed as a part of or behind the binder layer. There are numerous known combinations of adhesives for applying the transfer to an article such as a fabric. There are also various protective layers disposed over the beads and removable upon the transfer being applied to an article.

SUMMARY OF THE INVENTION

The subject invention provides an improved heat transfer having higher reflective capacities than known heat transfers and which may be applied or transferred to articles of a wider range of different materials.

The first feature of the invention is to provide a reflective heat transfer by applying a carrier layer, which is responsive to heat for melting, over an absorbent substrate in a predetermined pattern so that the carrier layer will be melted in response to heat and absorbed into the substrate and embedding a layer of reflective particles into the carrier layer and applying a liquid coating around the particles and over the carrier layer and drying the coating to bind the particles in position.

Another feature is the applying of a powdered adhesive, which is responsive to heat for melting and bonding, over the coating before drying the coating whereby the coating may be placed against an article to which the transfer is to be bonded and heat applied to melt the powdered adhesive to bond the transfer to the article.

PRIOR ART STATEMENT

U.S. Pat. No. 3,172,942, granted Mar. 9, 1965, to H. A. Berg discloses a transfer including transparent beads partially embedded in a pigmented binder layer with a heat barrier film disposed over the binder layer and an adhesive layer over the heat barrier film, the adhesive layer being pressed or forced into an article to which the transfer is to be applied. Before the transfer is applied, there is included a removable liner or sheet covering the adhesive layer to protect it from contamination prior to application of the transfer. In addition, there is a carrier sheet having a carrier coating thereon surrounding the glass beads and engaging the binder layer but which is strippable by force from the glass beads. The subject invention represents an improvement in that the adhesive need not be protected by a special layer and is much more effective for bonding to various different materials and the protective carrier layer surrounding the beads is completely absorbed by the absorbent substrate in response to heat during the transfer as the adhesive is melted and bonds to the article thereby overcoming the necessity of any removal force being applied to the beads or the bead binder layer.

U.S. Pat. No. 2,555,715 to J. C. Tatum, granted June 5, 1951, discloses the manner in which the beads disclosed herein reflect and a combination wherein the glass beads are disposed in a binder coating which is backed by a reflector coating which is, in turn, disposed on a backside coating protected by a removable carrier sheet. Again, however, the combination of the Tatum patent does not provide the advantages set forth above in regard to the subject invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a fragmentary side-elevational view showing the first step in making the heat transfer combination by applying the carrier layer to an absorbent substrate;

FIG. 5 shows the step of making the transfer wherein the reflective particles are embedded within the carrier layer;

FIG. 6 illustrates the application of the binder layer around the reflective particles and over the carrier layer;

FIG. 7 illustrates the application of the reflective coating over the binder layer; and FIG. 8 illustrates the application of the powdered adhesive to the reflective layer.

DESCRIPTION OF THE PREFERRED EMBODIMENT

Figure 1:
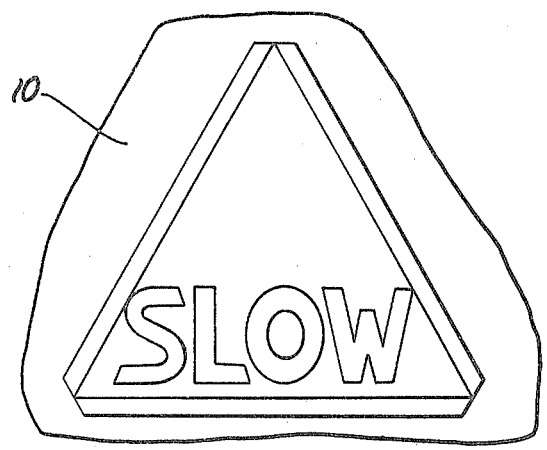
FIG. 1 shows a reflective heat transfer combination made in accordance with the subject invention and applied to an article.

FIG. 1 shows a reflective heat transfer combination made in accordance with the subject invention applied to an article 10 such as fabric making up an article of clothing. The reflective heat transfer portion is defined by the letters S-L-O-W and the surrounding triangular border.

Figure 2:
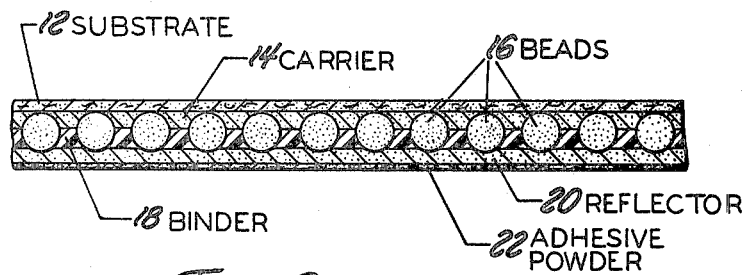
FIG. 2 is a fragmentary cross-sectional view of a reflective heat transfer made in accordance with the subject invention before being applied to an article.

The reflective heat transfer combination is shown in cross section in the configuration before being applied to an article in FIG. 2. The heat transfer includes an absorbent substrate 12. The absorbent substrate 12 is a fibrous material and, specifically, paper. A particle carrier or carrier layer 14 is disposed in a predetermined pattern over the substrate 12. The carrier layer 14 comprises a mixture of tack wax and a solvent, i.e., mineral spirits and preferably oleum. The carrier layer 4 is responsive to heat for melting and being absorbed by the paper substrate 12 when the transfer is being applied to an article.

A layer, i.e., monolayer, of reflective particles comprising spherical glass beads 16 are partially disposed or embedded in the carrier layer 14. The beads 16 are in engagement with the paper substrate 12 and have portions exposed above the carrier layer 14.

A coating is disposed around the beads 16 and engages the carrier layer 14. Specifically, the coating includes a binder or binder layer 18 surrounding the beads 16 and a reflector or reflective coat 20 disposed over the binder layer 18.

There is also included a powdered adhesive 22 embedded in the reflective coat 20. The powdered adhesive comprises small particles of powder embedded into the surface of the reflective coat 20 and which particles of adhesive are responsive to heat and pressure for adhesively securing the transfer to an article 10. The powdered adhesive is a thermal setting plastic and preferably consists of a polyester.

Figure 3:
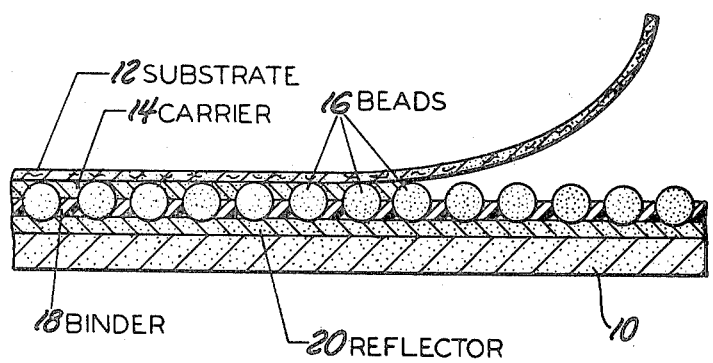
FIG. 3 is a cross-sectional view of a reflective heat transfer combination shown as being applied to an article.

The transfer is applied to an article 10 by placing the reflective coat 20 of the coating with the powdered adhesive 22 therein against the article 10 and applying heat and pressure to the paper substrate 12 to activate the powdered adhesive 22 whereby the adhesive responds to heat and bonds to the article and the carrier layer 14 is melted and absorbed into the paper substrate 12 for exposing the glass bead 16 upon removal of the paper substrate 12 and the absorbed carrier 14 as best illustrated in FIG. 3.

The method of making the reflective heat transfer combination is best shown in FIGS. 4 through 8.

As illustrated in FIG. 4, the heat transfer is made by applying a carrier layer 14, which is responsive to heat for melting, over an absorbent substrate 12 in a predetermined pattern so that the carrier layer 14 may be melted in response to heat and absorbed into the substrate 12. Specifically, a tacky mixture of tack wax and mineral spirits define the carrier layer 14 and the substrate 12 is a fibrous material or paper capable of absorbing the carrier layer 14 when melted in response to heat. The carrier layer 14 is made by melting tack wax at a medium heat so it turns into a clear liquid and then adding the solvent which is preferably oleum with the proportion being approximately seven parts tack wax to four parts oleum. The mixture defining the carrier layer 14 is applied to the paper substrate 12 by a silk screen process to define a predetermined area as, for example, the letters defining the word "SLOW" and the triangular border of the transfer illustrated in FIG. 1. The tacky mixture defining the carrier layer 4 remains tacky until absorbed into the paper substrate 12 in response to heat.

The substrate 12 with the carrier layer 14 thereon is pulled through a trough of microscopic clear glass spheres or beads to apply a single or monolayer of beads to the areas of the paper which have been printed or silk screened with the tacky carrier layer 14. Thereafter the sheet passes between two soft rubber rollers 24 and 26 whereby the beads 16 are forced into the carrier layer 14 to engage the substrate 12. As the glass beads 16 are forced into the carrier layer 14 and against the substrate 12, portions of the beads 16 remain exposed above the carrier layer 14. Anywhere from one-half to two-thirds of the glass beads may be left exposed above the carrier layer 14.

Next, and as illustrated in FIG. 6, a liquid binder layer 18 is applied around the beads and over the carrier layer 14. The binder layer is applied with a silk screen process with its periphery being within the periphery of the carrier layer 14 so that the binder layer 18 does not contact the substrate 12. The binder layer 18 is preferably an acrylic plastic. The liquid binder layer 18 is then dried whereby the beads 16 are locked in position and prevented from moving in the tacky carrier layer 14. The binder layer 18 may nearly cover tops of the beads 16 or may actually form a thin film over the tops of the beads 16.

Thereafter, a liquid reflective coat 20 is applied over the binder layer 18 to cover tops of the beads 16 and be disposed over the binder layer 18. This liquid reflective coat is applied to the binder layer 18 by silk screen to cover designated areas over the binder layer 18.

The binder layer 18 may include a pigment to provide a color. Further, by the silk screen process one area of the carrier layer 14 may be covered with a binder layer of one color whereas the remaining or different areas may be covered with a binder layer of different colors. The reflective coat then would preferably be white although the reflective coat may be of any material which would provide a light reflection back through the beads. In other words, the binder layer may be of different colors in different areas to provide different colored areas or designs in the transfer. Thereafter the reflective coat or reflector (preferably a white pigment) is disposed over the binder for reflecting light back through the beads. Alternatively, the binder layer 18 may be clear or transparent with merely the reflective color coat applied thereover. It is also within the contemplation of the invention that the binder layer 18 would be clear with one or more different colors applied thereover in different areas to define different color areas within a reflective coat or reflector (such as a white coat) disposed thereover for reflecting light back through the beads.

After the liquid reflective coat 20 has been silk screened in place over the binder layer and while still a liquid, particles of powdered adhesive are applied over the reflective coat 20 to be absorbed or embedded in the surface thereof and, thereafter, the reflective coat 20 is dried to solidify. The powdered adhesive 22 is a thermal setting plastic, e.g., a polyester and one which may be utilized is manufactured by Eastman Kodak under the trademark "SA-250 HOT MELT ADHESIVE." The powdered adhesive is responsive to heat for melting and bonding and when the transfer is applied, as illustrated in FIG. 3, the powdered adhesive melts and bonds to the article 10. It is important that there need be no protective layer covering the adhesive coat 20 to protect the adhesive as the adhesive responds only to heat and pressure for bonding while, at the same time, the carrier layer 14 is absorbed into the paper substrate 12 for exposing the beads 16 upon removal of the paper substrate 12 with the carrier layer 14 absorbed thereinto.

The binder layer is made of an acrylic plastic with pigment added thereto to provide the desired color. Additionally, in the preferred embodiment the reflective coat is the same acrylic plastic having a white pigmentation added thereto for providing a reflective coat. Both the binder layer and the reflective coat are compatible with the tacky petroleum based mixture defining the carrier layer 14.

The acrylic plastic forming the basis for the binder layer 18 and the reflective coat 20 is made by mixing approximately forty-seven percent (47%) of a material sold under the trademark "DURO-CRYL 490" with forty-seven percent (47%) of the material sold under the trademark "DURO-TRON 620" with one percent (1%) of a plasticizer and three percent (3%) of a dry retarder and one percent (1%) of a thickening agent and one percent (1%) of a cross-linker and thereafter adding one ounce per gallon of ammonium hydroxide. All of these materials are mixed together except the thickening agent and then one (1) ounce per gallon of ammonium hydroxide is added or until an approximate 7.6 pH is reached. These materials are mixed together and then one to three pounds of pigment per gallon of mixture is added and mixed and thereafter the one percent (1%) thickening agent is added to give the mixture the proper viscosity for printing or silk-screening.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of making a reflective heat transfer combination including the steps of; applying a tacky mixture of tack wax and mineral spirits in a carrier layer over a paper substrate capable of absorbing the carrier layer when melted in response to heat, disposing a layer of glass beads over the carrier layer, forcing the glass beads into the carrier layer and against the substrate while allowing portions of the beads to be exposed above the carrier layer, applying a liquid binder layer around the beads and over the carrier layer, drying the binder layer, applying a liquid reflective coat over the binder layer and covering the beads, applying powdered adhesive over the reflective coat while the reflective coat is liquid, and drying the reflective coat and applying the heat transfer combination to an article by placing the coating with the powdered adhesive therein against the article and applying heat and pressure to activate the powdered adhesive whereby the adhesive responds to heat and melts and bonds to the article.

* * * * *